(12) United States Patent
Gao et al.

(10) Patent No.: US 12,260,239 B2
(45) Date of Patent: Mar. 25, 2025

(54) MONITORING CONTAINERIZED VM APPLICATION RUNNING WITHIN SOFTWARE CONTAINER

(71) Applicant: MICRO FOCUS LLC, Santa Clara, CA (US)

(72) Inventors: Jin-Feng Gao, Shanghai (CN); Guozhu Cao, Shanghai (CN); Xiaomei Qiu, Shanghai (CN)

(73) Assignee: Micro Focus LLC, Santa Clara, CA (US)

( * ) Notice: Subject to any disclaimer, the term of this patent is extended or adjusted under 35 U.S.C. 154(b) by 538 days.

(21) Appl. No.: 17/432,435

(22) PCT Filed: Mar. 29, 2019

(86) PCT No.: PCT/CN2019/080304
§ 371 (c)(1),
(2) Date: Aug. 19, 2021

(87) PCT Pub. No.: WO2020/198902
PCT Pub. Date: Oct. 8, 2020

(65) Prior Publication Data
US 2022/0147381 A1    May 12, 2022

(51) Int. Cl.
*G06F 9/455* (2018.01)
*G06F 11/30* (2006.01)

(52) U.S. Cl.
CPC ........... *G06F 9/45558* (2013.01); *G06F 2009/45591* (2013.01); *G06F 11/301* (2013.01); *G06F 11/302* (2013.01)

(58) Field of Classification Search
None
See application file for complete search history.

(56) References Cited

U.S. PATENT DOCUMENTS

| | | |
|---|---|---|
| 9,304,885 B2 | 4/2016 | Bala |
| 10,154,065 B1 | 12/2018 | Buchler |
| 2016/0378517 A1* | 12/2016 | Zellermayer ......... G06F 9/4555 718/1 |
| 2017/0116415 A1 | 4/2017 | Stopel |
| 2017/0171091 A1* | 6/2017 | Nayak ................... H04L 47/25 |
| 2018/0048545 A1 | 2/2018 | Mishalov |

(Continued)

FOREIGN PATENT DOCUMENTS

| | | |
|---|---|---|
| CN | 104410671 B | 11/2017 |
| CN | 107766123 B | 10/2020 |

OTHER PUBLICATIONS

Boston Commons High Tech Network; Automated Web Application Monitoring Solution; Engineering & Automation; Boston Commons High Tech Network; Jul. 26, 2018; 50 pages.

(Continued)

*Primary Examiner* — Eric C Wai
(74) *Attorney, Agent, or Firm* — Sheridan Ross P.C.

(57) ABSTRACT

A monitoring utility program into a software container in which a containerized virtual machine application is running. The monitoring utility program is to monitor the containerized virtual machine application running within the software container. Monitoring information regarding the containerized virtual machine application is periodically pulled from the monitoring utility program.

20 Claims, 4 Drawing Sheets

(56) References Cited

U.S. PATENT DOCUMENTS

2018/0144123 A1    5/2018  Levin
2018/0288129 A1*  10/2018  Joshi .................. H04L 43/20
2018/0300348 A1    10/2018  Rao
2018/0349629 A1    12/2018  Chenchev

OTHER PUBLICATIONS

Hewlett Packard Enterprise; HPjmeter 4.5 Release Notes and Installation Guide; 2012, 2017 Hewlett Packard Enterprise Development LP; May 2017; 24 pages.
International Search Report & Written Opinion; PCT/CN2019/080304; Mailed Jan. 8, 2020; 9 pages.
Java; J2EE Monitoring; Java/J2EE Monitoring—AppPerfect; http://www.appperfect.com/support/tutorials/monitoring/java-j2ee-monitoring/java-monitoring.php; Nov. 2018; 10 pages.
Oracle; Java Platform, Standard Edition Tools Reference; jvisualvm; https://docs.oracle.com/javase/8/docs/technotes/tools/unix/jvisualvm.html; Nov. 2018; 2 pages.
Oracle; Troubleshooting Guide for Java SE 6 with HotSpot VM; Nov. 2008; 154 pages.

* cited by examiner

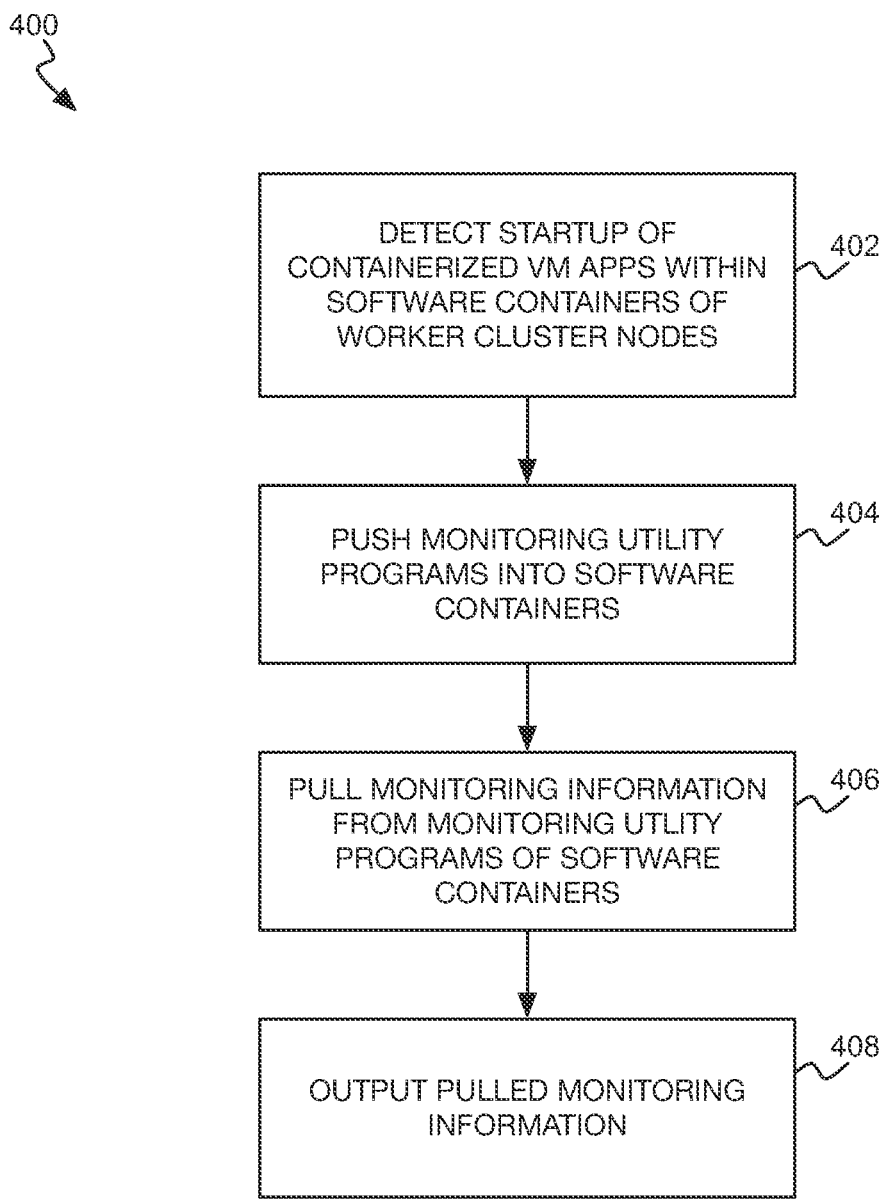

MONITORING CONTAINERIZED VM APPLICATION RUNNING WITHIN SOFTWARE CONTAINER

BACKGROUND

A container is a standard unit of software that packages the code of an application and its dependencies so that the application can quickly and reliably run within different computing environments. A container image is a lightweight, standalone, and executable package of software that includes everything needed to run an application: code, runtime and system tools, system libraries and settings. A container image becomes a container at runtime, where it is run on a container engine or platform. Containerized software thus runs the same, regardless of the underlying hardware infrastructure and the host operating system running on the hardware infrastructure. Containers isolate software from its operating environment, therefore ensuring that the software operates uniform regardless of environment.

BRIEF DESCRIPTION OF THE DRAWINGS

FIG. 4 is a flowchart of an example method.

DETAILED DESCRIPTION

Figure 1:
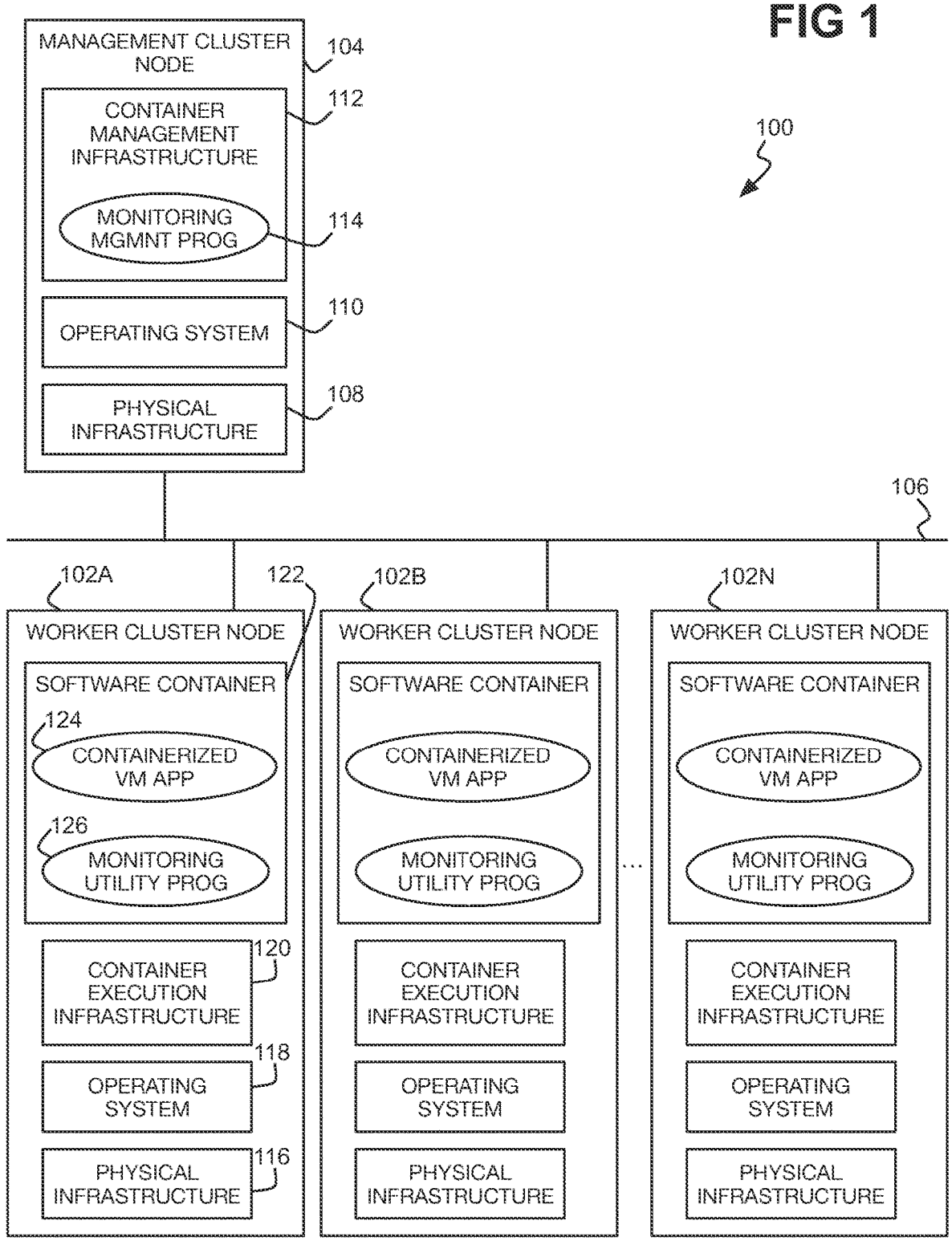
FIG. 1 is a diagram of an example computing system providing container clustering of containerized virtual machine (VM) applications over worker cluster nodes.

As noted in the background section, a container permits software to uniformly run, regardless of the underlying hardware infrastructure and the host operating software running on the infrastructure. Specifically, a container engine or platform runs on the host operating system of an underlying hardware infrastructure, and the container runs on top of this platform. An example of container technology is DOCKER container technology, which provides operating system level virtualization, which can also be referred to as containerization.

Software that can be containerized includes virtual machine (VM) applications, such as JAVA VM (JVM) applications. A container differs from a virtual machine in that a container provides a way to virtualize an operating system so that multiple workloads can run on the same host operating system instance. By comparison, a virtual machine provides a way to virtualize hardware to run multiple operating system instances on the same hardware infrastructure. A container is thus run via one operating system kernel and is more lightweight than a virtual machine in that there is less processing overhead; multiple containers share the same operating system kernel, whereas multiple virtual machines have their operating system instances.

Containerized VM applications; including containerized JVM applications, can be clustered. In container-based VM application clustering, containerized replicas of the VM application are deployed over multiple worker cluster nodes, which can be separate physical server computing devices, or servers. The VM application instances running in the containers deployed on the worker cluster nodes can provide the same software service, such as the same network or web service, on the same networking ports, A management cluster node orchestrates the containerized replicas of the VM application, including load balancing the software service over the worker cluster nodes. An example of container-based clustering is DOCKER SWARM. The clustered containers can be orchestrated by SWARM itself or via other software, such as KUBERNETES cluster orchestration software.

A difficulty associated with clustering containerized JVM applications is monitoring the JVMs of the containerized JVM applications. Existing monitoring techniques generally require that each container including a containerized JVM application having its startup parameters reconfigured. If the JVM application is currently running, for the reconfigured startup parameters to take effect the containerized JVM application has to be shut down and restarted. A containerized JVM application may be clustered over tens, hundreds, or even more replica instances, which means that significant time and effort has to be expended so that the container in which each JVM application instance is running is properly configured.

One example of such existing monitoring is the usage of JAVA Management Extensions (JMX), which is a JAVA technology that supplies tools for managing and monitoring applications, including in the context of the JAVA Platform, Enterprise Edition (J2EE). For example, the Jconsole program is provided by the JAVA Development Kit JDK and provides JVM runtime information through JMX. In the context of containerized JVM clustering, each container on which a JVM application is running has to have its startup parameters configured to define a different set of network ports on which the container in question reports its monitoring information. For a large set of containers deployed over multiple worker duster nodes, therefore, care has to be taken to ensure that the network ports used by each container do not overlap with those of other network ports to ensure the accurate reporting of information.

Another example of an existing monitoring technique is the usage of third-party agents for containerized JVM applications. The JVM applications have to be configured to use the agents. Such configuration can involve adding tags like "-javaagent" within the configuration files and JAVA archive (JAR) files defined in startup parameters of each JVM application. As noted above, for such reconfiguration to take effect, each reconfigured containerized JVM application has to be restarted. While third-party agents can provide for rich monitoring information, the laborious configuration process necessary to deploy the agents has limited their widespread adoption.

Techniques described herein ameliorate these difficulties associated with monitoring containerized VM applications, such as containerized JVM applications, including those with are clustered over multiple service replica instances on containers deployed on worker cluster nodes. A monitoring utility program is pushed into the software container in which a containerized VM application is running. Monitoring information regarding the containerized VM application is periodically pulled from the monitoring utility program, and output. The running of the containerized VM application can itself be modified based on the monitoring information that has been pulled.

The containerized VM application therefore does not have to be reconfigured in order for the monitoring utility program to collect monitoring information regarding the VM. This is at least because the monitoring utility program runs completely independently and is separate from the VM application within the container. The containerized VM application may indeed be unaware that a monitoring utility program is present within the container and is periodically being run. Pushing of the monitoring utility program, in other words, occurs in conjunction with the container execution engine (i.e., at the infrastructure level) without configuration of the containerized VM application running in a container on the engine.

Furthermore, the containerized VM application does not have to be stopped and restarted for the monitoring utility program to be pushed into its container and subsequently periodically run. As such, there is no downtime of any running containerized VM application to add monitoring capability, which means in the case of a containerized VM application clustered over multiple service replica instances on containers of different worker cluster nodes there is no downtown of a software service cooperatively provided by the replicas. Such downtime avoidance, in conjunction with not having to configure each individual containerized JVM application (i.e., replica or instance) running in a container, decreases costs associated with deploying monitoring of containerized JVM applications.

FIG. 1 shows an example computing system 100 providing container clustering of containerized VM applications. The system 100 includes multiple worker duster nodes 102A, 102B, . . . , 102N, which are collectively referred to as the worker cluster nodes 102. The system 100 includes a management cluster node 104 that manages and orchestrates the worker duster nodes 102, via communication over a network 106, which may include a local-area network (LAN), a wide-area network (WAN), the Internet, an intranet, an extranet, and so on.

The management cluster node 104 can be a server computing device, or server, and has a physical infrastructural 108, which includes the hardware of the cluster node 104, such as processors, memory, storage devices, and so on. The node 104 includes an operating system 110 that runs on the physical infrastructure 108, and which may be a version of the LINUX operating system, the UNIX operating system, the WINDOWS operating system, or another type of operating system.

The management cluster node 104 includes container management infrastructure 112 that runs on the operating system 110 running on the physical infrastructure 108 of the node 104. The container management infrastructure 112 is the engine that provides for orchestration and management of containerized VM application clustering over the worker cluster nodes 102. For example, the container management infrastructure 112 may be the DOCKER SWARM software tool to manage dusters of DOCKER containers, or the KUBERNETES platform that can similarly be used to manage dusters of DOCKER containers. DOCKER SWARM and KUBERNETES can both be generally considered as software container duster management programs.

A monitoring management program 114 runs within the context of the container management infrastructure 112. In one implementation, the monitoring management program 114 may run within a container running on the container management infrastructure 112. In another implementation, the monitoring management program 114 may be a part of the container management infrastructure 112. In still another implementation, the monitoring management program 112 may run external to the infrastructure 112, but still in conjunction with the infrastructure 112, insofar as the program 114 uses the infrastructure 112 to communicate with the worker cluster nodes 102.

The worker cluster node 102A is described as representative of each of the worker cluster nodes 102. The worker cluster node 102A may be a computing device like a server computing device, or server, including physical infrastructure 116, such as processors, memory, storage devices, and so on. An operating system 118, like a version of the LINUX, UNIX, or WINDOWS operating system, s on the physical infrastructure 116, and a container execution infrastructure 120 runs on the operating system 118. The container execution infrastructure 120 is a container engine or platform, like the DOCKER container engine or platform, that permits software containers to be deployed and run on the worker cluster node 102A.

As such, a software container 122 runs on the container execution infrastructure 120 running on the operating system 118 that itself runs on the physical infrastructure 116 of the worker duster node 102A. The software container 122 can be a DOCKER software container, and includes a containerized VM application 124. The VM application 124 is an application program that runs within a VM and that has been containerized so that it can run on a container like the software container 122. For example, the containerized VM application 124 may be a containerized JVM application.

The containerized VM application 124 may be an instance of a VM application that is replicated on the software container 122 of each worker duster node 102. For instance, each VM replica instance may provide the same network, application, or web service on the same networking port. In this respect, the container management infrastructure 112 may orchestrate running of the service across the containerized instances of the VM application 124 on the containers 122 of the worker duster nodes 102 for load balancing and other purposes. Such clustering permits scaling of the service, as well as failover and other functionality, to maintain performance and minimize downtime of the service.

In the case of a containerized JVM application, the containerized VM application 124 is a JAVA application that has been compiled into machine code so that it can be directly run on a JVM without the need for runtime interpretation. The JVM itself becomes part of the JVM application during this compilation process, so that the JVM can be deployed within a suitable JAVA runtime environment (JRE). The resulting JVM application is then containerized using a container platform like the DOCKER container platform to permit the JVM application to run within a container, like the software container 122, that does not have its own guest operating system (i.e., the operating system 118 is separate from the software container 122 and not pat of the container 122).

The software container 122 also includes a monitoring utility program 126 that runs within the container 122 separate from the containerized VM application 124. The containerized VM application 124 does not have to be reconfigured, or stopped and restarted, to inject and subsequently run the monitoring utility program 126 into the container 122. The monitoring utility program 126 rather is pushed into the software container 122 at the level of the container execution infrastructure 120. This infrastructure level can correspond to the container execution engine (e.g., DOCKER) that provides for deployment of the container 122 on the physical infrastructure 116 of the worker cluster node 102A in the case of container clustering.

As such, adding the monitoring utility program 126 into the software container 122 is managed or performed at the worker cluster node 102A itself via the container execution infrastructure 120 without involving the containerized VM application 124. The monitoring utility program 126 can be provided by the development kit associated with the containerized VM application 124. For instance, the monitoring utility program 126 can be provided by the JDK in the case of a JVM application, such as JDK command-line interface (CLI) utility or monitoring programs like the jstat, jstack, and jmap CLI utility or monitoring programs.

When caused to be run, such as via a command sent from the monitoring management program 114 on the management cluster node 104 to the container execution infrastructure 120 on the worker cluster node 102A over the network 106, the monitoring utility program 126 collects current runtime information. The monitoring utility program 126 then transmits such monitoring information regarding the VM of the containerized VM application 124 (and thus regarding the VM application 124) back to the monitoring management program 114. The monitoring utility program 126 subsequently exits, or quits (i.e., ceases to run).

Periodic running of the monitoring utility program 126 on each worker cluster node 102 as orchestrated by the monitoring management program 114 on a scheduled basis therefore provides for health status of the worker cluster nodes 102. Specifically, such overall health status can include the overall health status of the service provided by the containerized VM applications 124 running within the software containers 122 of the worker cluster nodes 102. The overall health status can also be that of the individual VM applications 124 making up the instances of the service replicated over the software containers 122 of the worker cluster nodes 102.

In the case in which the monitoring utility program 126 is an existing CLI or other program provided by the development kit in accordance with which the containerized VM application 124 was developed, the monitoring techniques provided herein thus leverage such existing utility programs. That is, for a containerized JVM application 124, the monitoring techniques leverage existing JDK utility programs like jstat, jstack, and jmap CLI utility or monitoring programs to be used to monitor the JVM of the application on each cluster node 102 in an agentless manner without involving the JVM application 124 itself. Such utility programs are not agents of the containerized JVM application 124, but rather simply run within the same JVM of the same container 124 as the application 124 itself does.

The utility or monitoring programs, as CLI programs, can be run asynchronously with the JVM application 124, and their standard console output redirected for transmission to the monitoring management program 114 running on the management cluster node 104 when the program 114 initiates running of such a monitoring utility program 126 on a worker cluster node 102 via the container execution infrastructure 120. In this respect, such CLI utility or monitoring programs are employed for a purpose for which they were not intended: agentless monitoring of containerized JVM applications 124 without having to reconfigure or stop and restart any containerized JVM application 124. Leveraging these CLI utility or monitoring programs in the context of containerized JVM application clustering means that bespoke monitoring utility programs 126 do not necessarily have to be developed for monitoring of the JVM applications 124 by the monitoring management program 114.

Figure 2:
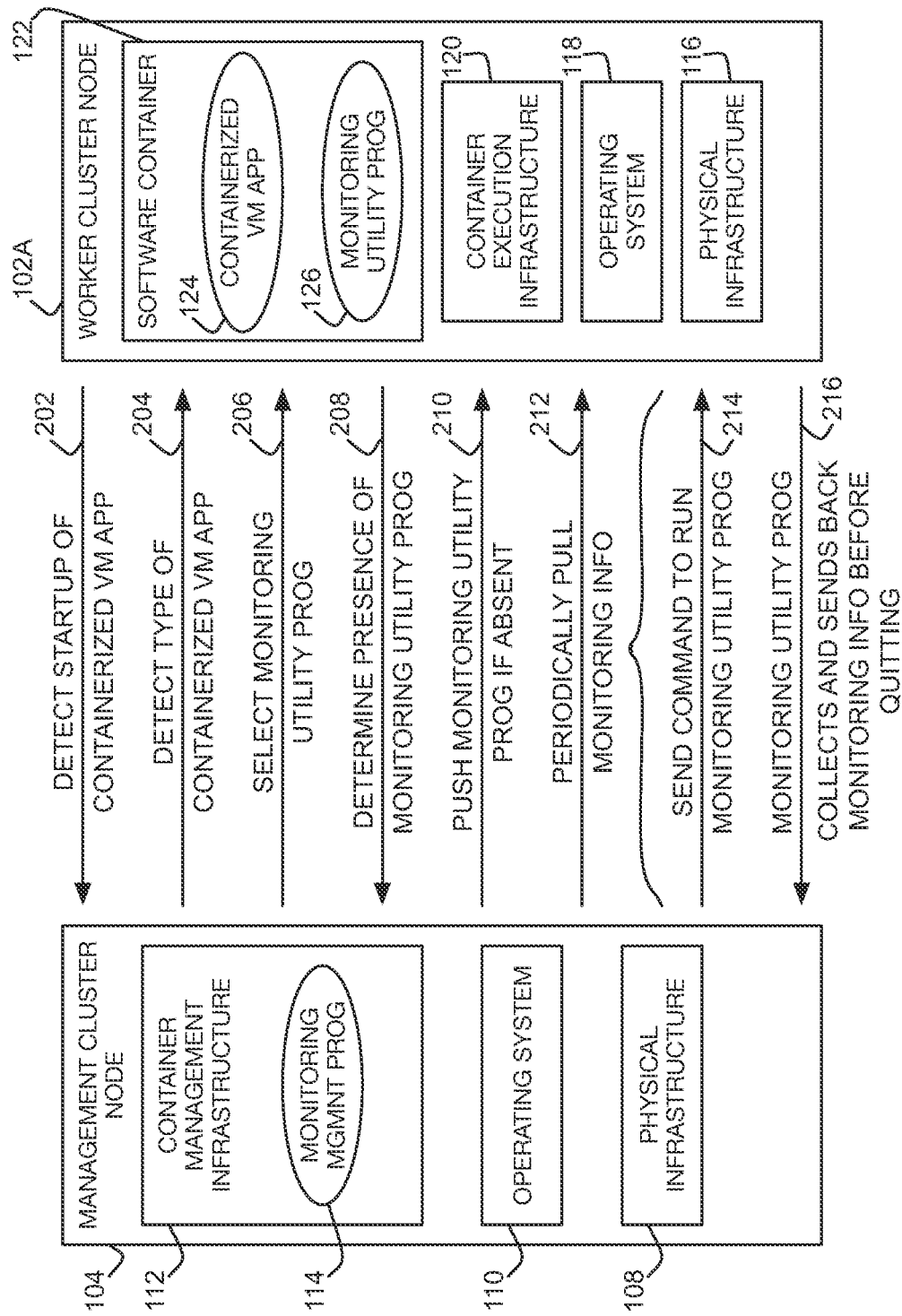
FIG. 2 is a diagram of an example process by which a monitoring management program monitors a containerized VM application on a worker cluster node of FIG. 1.

FIG. 2 shows an example process by which the monitoring management program 114 on the management cluster node 104 monitors the containerized VM application 124 on the worker duster node 102A specifically. The same approach can be employed for the containerized VM application 124 running on every other worker duster node 102 as well. In the example of FIG. 2, the software container 122 has already been deployed on the worker cluster node 102A, via the container execution infrastructure 120 running on the operating system 118 that itself runs on the physical infrastructure 116 of the node 102A. Furthermore, the containerized VM application 124 has already been deployed, again via the container execution infrastructure 120, within the software container 122.

When the containerized VM application 124 starts up (i.e., begins running), the monitoring management program 114 running in the context of the container management infrastructure 112 running on the operating system 110 that itself runs on the physical infrastructure 108 of the management cluster node 104 can detect such startup (202). For instance, a containerized JVM application 124 will include its it process startup commands the initiation of JAVA, which the monitoring management program 114 can detect through the container execution infrastructure 120 supporting the software container 122 in which the JVM application 124 has started. As part of the orchestration provided by the container management infrastructure 112, in other words, the container execution infrastructure 120 may automatically report back information on the software container 122, such as the containerized VM application 124 starting up therein, which the monitoring management program 114 can leverage.

The monitoring management program 114 may also detect the type of the containerized VM application 124 starting up within the software container 122 (204). For example, in the case of a containerized JVM application 124, the application 124 may also process startup commands that establish defined services on specific network ports. The monitoring management program 114 can use this information to identify the containerized JVM application 124 an instance of a JVM application replicated over multiple duster nodes 102. As such, the monitoring management program 114 can group the instant JVM application 124 starting up on the worker duster node 102A with other replica instances of the same JVM application 124 running on other cluster nodes 102 for health monitoring purposes. The group of such containerized JVM applications 124 running on the worker cluster nodes 102 includes those applications 124 that expose the same service on the same network ports, and in the context of the DOCKER platform can be said to correspond to how KUBERNETES uses the term "deployment."

The monitoring management program 114 may select the monitoring utility program 126 for the software container 122 based on the detected type of the containerized VM application 124 (206). For example, which CLI utility or monitoring programs provided by the development kit in conjunction with which the containerized VM application 124 has been developed should be used to monitor the VM application 124 can be selected. Certain types of monitoring information may be desired or needed just for certain types of containerized VM applications. As such, determining the service that a particular containerized VM application 124 exposes may be beneficial in determining which monitoring utility program 126 to use to monitor the VM application 124.

The monitoring management program 114 can detect whether the selected monitoring utility program 126 is already present within the VM of the containerized VM application 124 (208). For instance, some VM deployments may automatically include certain development kit utility programs. As an example, a JAVA application that is compiled to run as a standalone JVM application (and then containerized as a containerized JVM application 124) may as part of this compilation automatically include certain JDK CLI utility or monitoring programs.

However, if the monitoring utility program 126 is absent from the software container 122, then the monitoring management program 114 pushes the monitoring utility program 126 into the container 122 at the level of the container execution infrastructure 120. The containerized VM application 124 has already started up, and thus is currently running. At least because the monitoring utility program 126 is separate from the VM application 124 within the software container 122, the program 126 does not have to be stopped and restarted for injection of the monitoring utility program 126 into the container 122, as noted above.

Pushing of the monitoring utility program 126 is handled by the monitoring management program 114 in conjunction with the container execution infrastructure 120. This can be achieved because the container 122 itself was deployed as orchestrated by the container management infrastructure 112 in context with which the monitoring management program 114 runs. As an example, the monitoring management program 114 can utilize the copying command "kubectl cp" to push the runtime executable code of the monitoring utility program 126 into the container 122 if the KUBERNETES orchestration program is being used.

As has been described, then, the monitoring utility program 126, such as a JDK CLI utility or monitoring program in the case of a containerized JVM application 124 developed in accordance with the JDK that provides the CLI utility or monitoring program, does not require any configuration on the part of the JVM application 124 itself. That is, JMX or other extensions do not have to be included within the startup parameters of the containerized JVM application. The monitoring utility program 126 is an agentless such program, insofar as it is not an agent of the JVM application 124 because the application 124 does not have to specify in its configuration that information is to be reported to the utility program 126. The techniques described herein thus leverage a monitoring utility program 126 that can be pushed at the level of the container execution infrastructure 120 into the software container 122 apart from the containerized VM application 124 and indeed without the knowledge of the application 124.

The monitoring management program 114 periodically pulls monitoring information regarding the containerized VM application 124 (i.e., the VM that is a part of the application 124) from the monitoring utility program 126, through the container execution infrastructure 120, Specifically, the monitoring management program 114 sends a command via the container management infrastructure 112 orchestrating the software container 122 on the container execution infrastructure 120 of the worker duster node 102A for the container execution infrastructure 120 to initiate running of the monitoring utility program 126 (214). In the case of a CLI utility or monitoring program, the command can include command-line options or tags that specify which monitoring information the monitoring utility program 126 should collect regarding the containerized VM application 124, and that further redirect standard command-line output into a text file that the monitoring utility program 126 sends back to the monitoring management program 114 via the container execution infrastructure 120. As an example, the monitoring management program 114 can utilize the command "kubectl exec" on the container 122 through the container execution infrastructure 120, and append "jstat-gc" to initiate running of the JDK Jstat CLI utility or monitoring program and cause this program to collect garbage collect information, if the KUBERNETES orchestration program is being used.

As such, the monitoring utility program 126 collects and sends back monitoring information to the monitoring management program 114 before quitting (216). The monitoring management program 114 can perform such pulling of monitoring information regarding the containerized VM application 124 running on the software container 122 of every worker cluster node 102, in accordance with a schedule. The monitoring management program 114 may aggregate this information at a group level, so that monitoring information regarding all the instances of a VM application replicated over the containers 122 of multiple worker cluster nodes 102 can be examined. As such, monitoring information regarding individual VM applications 124 running on the containers 122 of specific worker cluster nodes 102 can be compared against the group as a whole, to identify those individual VM applications 124 that are operating abnormally.

The monitoring information collected by the monitoring utility program 126 in this respect can include such information as processor traces, memory utilization, garbage collection utility, and threading activities. Memory and thread dump generation can occur automatically as part of the monitoring information. Based on the monitoring information, the monitoring information can be output for display to the user, by the monitoring management program 114. Such output can include modification as to the running of the containerized VM application 124 within the software container 122 of a particular worker cluster node 102A that has been detected as operating abnormally. For example, the VM application 124 in question may be shutdown completely, or restarted, or it may have its startup parameters modified, in an attempt to have the application 124 run properly again.

Figure 3:
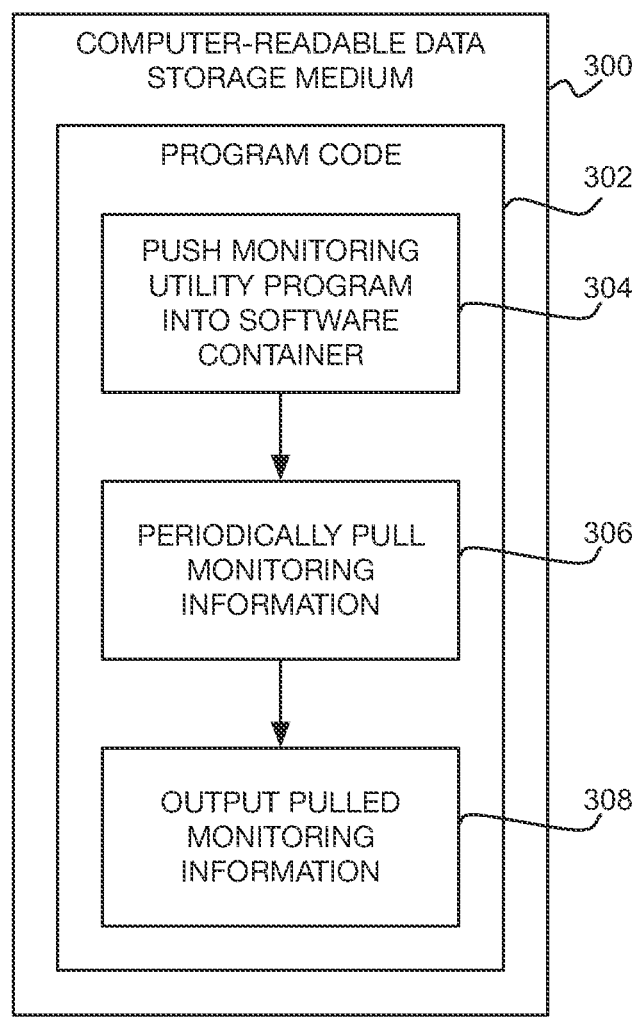
FIG. 3 is a diagram of an example non-transitory computer-readable data storage medium.

FIG. 3 shows an example non-transitory computer-readable data storage medium 300. The computer-readable data storage medium 300 stores program code 302 executable by a processor. For example, the processor may be part of the physical infrastructure 108 of the management cluster node 104. The program code 302 may be that of the monitoring management program 114. Execution of the program code 302 results in processing being performed.

The processing includes pushing the monitoring utility program 126 into a software container 122 in which a containerized VM application 124 is running (304). The monitoring utility program 126 is to monitor the VM application 124 within the software container 122, and as noted above, can be pushed into the container 122 while the VM application 124 is actively running. The VM application 124 does not have to be preconfigured for the monitoring utility program 126 to be pushed into the container 122, nor for the monitoring utility program 126 to monitor the VM application 124; from the perspective of the VM application 124, the monitoring is agentless.

The processing includes periodically pulling monitoring information regarding the VM application 124 from the monitoring utility program 126 (306), as has been described. Thus, a command can be sent to the software container 122 to run the monitoring utility program 126, which causes the monitoring utility program 126 to detect and send back the monitoring information and then to stop running. The processing can then include outputting the pulled monitoring information (308), including modifying, based on the monitoring information, how the containerized VM application 124 runs.

FIG. 4 shows an example method 400. The method 400 can be performed by a processor of a computing service. For example, the processor may be part of the physical infrastructure 108 of the management cluster node 104. As such, the method 400 can be considered as being performed by the monitoring management program 114 that the processor of the physical infrastructure 108 executes.

The startup of containerized VM applications 124 within the software containers 122 deployed on the worker cluster nodes 102 is detected (402). The startup of the VM applications 124 is detected as they are started. The monitoring utility program 126 can be pushed at an infrastructure level into each software container 122 (404), external to the VM application 124 running in the container 122.

Monitoring information can then be subsequently periodically pulled regarding the containerized VM applications 124 from the monitoring utility programs 126 (406). As noted above, this can be achieved by initiating running of the monitoring utility program 126 that has been pushed into each container 122, with the program 126 then responsively sending back the monitoring information it collected or detected back to the monitoring management program 114. The monitoring information regarding the containerized VM applications 124 can then be output (408).

The techniques that have been described herein thus ease monitoring containerized VM applications 124 running within software containers 122. The VM applications 124 do not have to be stopped and restarted for monitoring to be able to occur, and the applications 124 do not have to be configured to provide for such monitoring. Therefore, the monitoring scales well as the number of VM applications 124 increases, as is the case when a VM application is replicated over a large number of instances of the application running on different software containers 122.

We claim:

1. A non-transitory computer-readable data storage medium storing program code executable by a processor of a management cluster node managing container-based virtual machine (VM) application clustering in which containerized replicas of a VM application are deployed over a plurality of worker cluster nodes to provide a same software service, the program code executable by the processor to perform processing comprising:
   respectively executing instances of the VM application in a plurality of software containers respectively running on the worker cluster nodes;
   respectively pushing a plurality of monitoring utility programs into the software containers, while the instances of the VM applications are executing in the software containers,
      wherein each monitoring utility program is to monitor an instance of the VM application executing in the software container into which the monitoring utility program has been pushed;
   periodically pulling, from each monitoring utility program, monitoring information regarding the instance of the VM application executing in the software container into which the monitoring utility program has been pushed,
      wherein each monitoring utility program monitors the instance of the VM application executing in the software container into which the monitoring utility program has been pushed without having to preconfigure the instance and without having to shut down and restart the instance; and
   outputting the periodically pulled monitoring information.

2. The non-transitory computer-readable data storage medium of claim 1, wherein outputting the periodically pulled monitoring information comprises modifying execution of the instance of the VM application executing in at least one of the software containers based on the periodically pulled monitoring information.

3. The non-transitory computer-readable data storage medium of claim 1, wherein monitoring of the instance of the VM application executing in each software container by the monitoring utility program pushed into the software container is agentless from a perspective of the instance of the VM application.

4. The non-transitory computer-readable data storage medium of claim 1, wherein where the monitoring information is periodically pulled from the monitoring utility program pushed into each software container by:
   sending a command to the software container to run the monitoring utility program,
   wherein running of the monitoring utility program causes the monitoring utility program to detect and send back the monitoring information and then to stop running.

5. The non-transitory computer-readable data storage medium of claim 1, wherein where the processing further comprises:
   determining whether each software container already includes the monitoring utility program,
   wherein the monitoring utility program is pushed into each software container that does not already include the monitoring utility program.

6. The non-transitory computer-readable data storage medium of claim 1, wherein where the processing further comprises:
   determining a type of the VM application; and
   selecting the monitoring utility program to push into each software container based on the type of the VM application.

7. The non-transitory computer-readable data storage medium of claim 1, wherein where the processing further comprises:
   detecting startup of the instance of the VM application within each software
   wherein the monitoring utility program is pushed into each software container responsive to detecting the startup of the instance of the VM application within the software container.

8. A method comprising:
   respectively executing instances of a virtual machine (VM) application in a plurality of software containers respectively running on a plurality of worker cluster nodes in accordance with container-based VM application clustering in which containerized replicas of the VM application are deployed over the worker cluster nodes to provide a same software service;
   detecting, by a monitoring management program running on a management cluster node managing the container-based VM application clustering, startup of the instances of the VM application in the software containers;
   after detecting the startup of the instances of the VM application within the software containers respectively running on the worker cluster nodes, respectively pushing, by the monitoring management program, a plurality of monitoring utility programs into the software containers, while the instances of the VM applications are executing in the software containers,
      wherein each monitoring utility program is to monitor an instance of the VM application executing in the software container in which the monitoring utility program has been pushed;

periodically pulling, by the monitoring management program and from each monitoring utility program, monitoring information regarding the instance of the VM application executing in the software container into which the monitoring utility program has been pushed, wherein each monitoring utility program monitors the instance of the VM application executing in the software container into which the monitoring utility program has been pushed without having to preconfigure the instance and without having to shut down and restart the instance; and outputting the periodically pulled monitoring information.

9. The method of claim 8, wherein the monitoring management program detects startup of the instances of the VM application as the instances are started.

10. The method of claim 8, wherein the monitoring utility program is pushed into each software container at an infrastructure level of the software container.

11. The method of claim 8, wherein the monitoring utility program is pushed into each software container external to the instance of the VM application running in the software container.

12. The method of claim 8, wherein the monitoring utility program pushed into each software container comprises a command-line interface (CLI) monitoring program provided by a development kit in accordance with which the VM application has been developed.

13. The method of claim 8, wherein the monitoring management program pulls the monitoring information regarding the instance of the VM application executing in each software container by initiating running of the monitoring utility program pushed into the software container, the monitoring utility program responsively sending the monitoring information to the monitoring management program before quitting.

14. The method of claim 8, wherein outputting the periodically pulled monitoring information comprises modifying running of the instance of the VM application executing in at least one of the software containers based on the periodically pulled monitoring information.

15. The method of claim 8, wherein monitoring of the instance of the VM application executing in each software container by the monitoring utility program pushed into the software container is agentless from a perspective of the instance of the VM application.

16. The method of claim 8, wherein where the monitoring information is periodically pulled from the monitoring utility program pushed into each software container by:

sending a command to the software container to run the monitoring utility program, wherein running of the monitoring utility program causes the monitoring utility program to detect and send back the monitoring information and then to stop running.

17. A computing system comprising:

a plurality of worker cluster nodes over which a containerized replicas of a virtual machine (VM) application have been deployed via container-based VM application clustering to provide a same software service; and a management cluster node to manage the container-based VM application clustering by:
respectively executing instances of the VM application in a plurality of software containers respectively running on the worker cluster nodes;
respectively pushing a plurality of monitoring utility programs into the software containers, while the instances of the VM applications are executing in the software containers,
wherein each monitoring utility program is to monitor an instance of the VM application executing in the software container into which the monitoring utility program has been pushed;
periodically pulling, from each monitoring utility program, monitoring information regarding the instance of the VM application executing in the software container into which the monitoring utility program has been pushed,
wherein each monitoring utility program monitors the instance of the VM application executing in the software container into which the monitoring utility program has been pushed without having to preconfigure the instance and without having to shut down and restart the instance; and
outputting the periodically pulled monitoring information.

18. The computing system of claim 17, wherein the monitoring management program detects the instances of the VM application as the instances are started, and pushes the monitoring utility program into each software container that has been deployed without inclusion of the monitoring utility program.

19. The computing system of claim 17, wherein outputting the periodically pulled monitoring information comprises modifying running of the instance of the VM application executing in at least one of the software containers based on the periodically pulled monitoring information.

20. The computing system of claim 17, wherein monitoring of the instance of the VM application executing in each software container by the monitoring utility program pushed into the software container is agentless from a perspective of the instance of the VM application.

* * * * *